United States Patent
Tondokoro et al.

(10) Patent No.: US 7,554,770 B2
(45) Date of Patent: Jun. 30, 2009

(54) AIR BEARING SURFACE OF THIN-FILM MAGNETIC HEAD SLIDER AND METHOD OF PROCESSING THE SAME

(75) Inventors: Atsushi Tondokoro, Niigata-ken (JP); Shinichi Tanaka, Niigata-ken (JP)

(73) Assignee: TDK Corporation, Tokyo (JP)

( * ) Notice: Subject to any disclaimer, the term of this patent is extended or adjusted under 35 U.S.C. 154(b) by 373 days.

(21) Appl. No.: 11/459,808

(22) Filed: Jul. 25, 2006

(65) Prior Publication Data
US 2007/0030598 A1 Feb. 8, 2007

(30) Foreign Application Priority Data
Aug. 8, 2005 (JP) ............... 2005-229025

(51) Int. Cl.
*G11B 5/60* (2006.01)
(52) U.S. Cl. .................................. 360/235.4
(58) Field of Classification Search ........... None
See application file for complete search history.

(56) References Cited

U.S. PATENT DOCUMENTS 5,943,187 A * 8/1999 Chen et al. ............... 360/235.2

2006/0072246 A1 * 4/2006 Fujimaki et al. ......... 360/235.1

FOREIGN PATENT DOCUMENTS

JP 2003-263712 9/2003

* cited by examiner

*Primary Examiner*—Allen T Cao
(74) *Attorney, Agent, or Firm*—Brinks Hofer Gilson & Lione

(57) ABSTRACT

A method of processing an air bearing surface of a thin-film magnetic head slider is provided. A first silicon film, a first carbon film, a second silicon film, and a second carbon film are laminated in that order on a face of a thin-film magnetic head slider facing a medium. A protrusion resist pattern that forms protrusions is formed on the second carbon film. Portions of the second carbon film and the second silicon film that are not covered with the protrusion resist pattern are removed by reactive ion etching with $O_2/CF_4$. A third carbon film is formed on the first carbon film exposed by the removal of the portions. The protrusion resist pattern is removed to expose the protrusions including the second silicon film and the second carbon film. An ABS resist pattern is formed on exposed surfaces of the protrusions and the third carbon film. A surface not covered with the ABS resist pattern is processed to impart an ABS uneven pattern.

6 Claims, 3 Drawing Sheets

AIR BEARING SURFACE OF THIN-FILM MAGNETIC HEAD SLIDER AND METHOD OF PROCESSING THE SAME

This application claims the benefit of the Japanese Patent Application No. 2005-229025 filed on Aug. 8, 2005, which is hereby incorporated by reference.

BACKGROUND

1. Field

A method of processing an air bearing surface (hereinafter, referred to as an "ABS") of a thin-film magnetic head slider to form an air-bearing-surface uneven pattern (hereinafter, referred to as an "ABS uneven pattern") on the ABS that generates lift force and a plurality of protrusions that reduce stiction is provided.

2. Related Art

Flying thin-film magnetic heads each includes a slider that incorporates, for example a magnetoresistive element or an inductive element. A flexure composed of a flexible metal supports the slider at the free end thereof. A load beam fixes the flexure. When a recording medium is stopped, the bottom face of the slider is in contact with a surface of the recording medium due to the elastic force of the load beam. The recoding medium begins to move, thereby generating airflow between the slider and the surface of the recording medium along the direction of motion of the recording medium. As a result, the slider flies over the surface of the recording medium because of lift force generated by the airflow. The thin-film magnetic heads each read or write while maintaining the flight position.

Thin-film magnetic heads include an ABS uneven pattern on the ABS that generates the lift force exerted on the face of the slider that faces the recording medium by the airflow between the slider and the surface of the recording medium. Protrusions reduce the adsorption force between the thin-film magnetic head and the surface of the recording medium and stiction due to the adsorption force when the thin-film magnetic head is at rest on the surface of the recording medium.

Japanese Unexamined Patent Application Publication No. 2003-263712 discloses the following process of producing the face of a slider that faces a medium. The slider having an ABS uneven pattern on an ABS that generates lift force and protrusions that reduce stiction. A first silicon film, a first carbon film, a second silicon film, and a second carbon film are laminated in that order on the face of the slider facing the medium. A resist pattern that defines the protrusions is formed on the second carbon film. Portions of the second carbon film and the second silicon film that are not covered with the resist pattern are removed by reactive ion etching (RIE) with an etching gas containing $O_2$ and $CF_4$.

The resist pattern is removed to form protrusions each including the second silicon film and the second carbon film on the first carbon film. The ABS uneven pattern is formed on the face of the slider that faces the medium by photolithography. A resist film is formed over the first carbon film and the protrusions. Exposure and development are performed to form a resist pattern for defining the ABS uneven pattern. Portions of the first carbon film and the first silicon film that are not covered with the resist pattern are removed by etching. The resist pattern is removed, thereby forming the ABS uneven pattern that includes the protrusions.

In the above-described known process, the resist pattern is disadvantageously detached in the step of forming the ABS uneven pattern. When development is performed in a state in which the resist pattern is detached, the ABS uneven pattern is inaccurately formed to degrade flying characteristics of the thin-film magnetic head.

SUMMARY

The surface, on which the resist pattern that defines the ABS uneven pattern will be formed, of the first carbon film is fluorinated by RIE with $CF_4$ to degrade the adhesion of the resist pattern. A method with the fluorinated first carbon film is covered with another carbon film to form a nonfluorinated surface, and then a resist pattern is formed on the nonfluorinated surface.

A method of processing an air bearing surface of a thin-film magnetic head slider is provided. The method includes the steps of laminating a first silicon film, a first carbon film, a second silicon film, and a second carbon film in that order on a face of the thin-film magnetic head slider. The face faces a medium; forming a protrusion resist pattern for defining the position and shape of a protrusion; performing reactive ion etching with $O_2$ and $CF_4$ to remove portions of the second carbon film and the second silicon film, the portions being not covered with the protrusion resist pattern, and the first carbon film functioning as an etch stop film during the reactive ion etching; forming a third carbon film over the first carbon film exposed by removing the second carbon film and the second silicon film; removing the protrusion resist pattern to expose the protrusion having the second silicon film and the second carbon film; forming an ABS resist pattern for defining the position and shape of an ABS uneven pattern on exposed surfaces of the protrusion and the third carbon film; and processing a surface not covered with the ABS resist pattern to impart the ABS uneven pattern.

The third carbon film preferably has a thickness of about 5 Å or more to cover the first carbon film.

The thickness of the second carbon film is greater than that of the first carbon film, and the thickness of the second silicon film is greater than that of the first silicon film.

The preferred embodimeent provides the method of processing the air bearing surface of the thin-film magnetic head slider, wherein the method improves the adhesion of the resist to accurately form the ABS uneven pattern.

DRAWINGS

DESCRIPTION OF THE PREFERRED EMBODIMENTS

A method of processing the air bearing surface (ABS) of a thin-film magnetic head slider according to an embodiment of the present invention will be described below with reference to FIGS. 1 to 6. FIGS. 2A, 3A, 4A, and 5A are each a cross-sectional view that show a step of processing an air bearing surface of a thin-film magnetic head slider. FIGS. 2B, 3B, 4B, and 5B are each a plan view that show the step, the view being viewed from a face that faces a medium.

Figure 1:
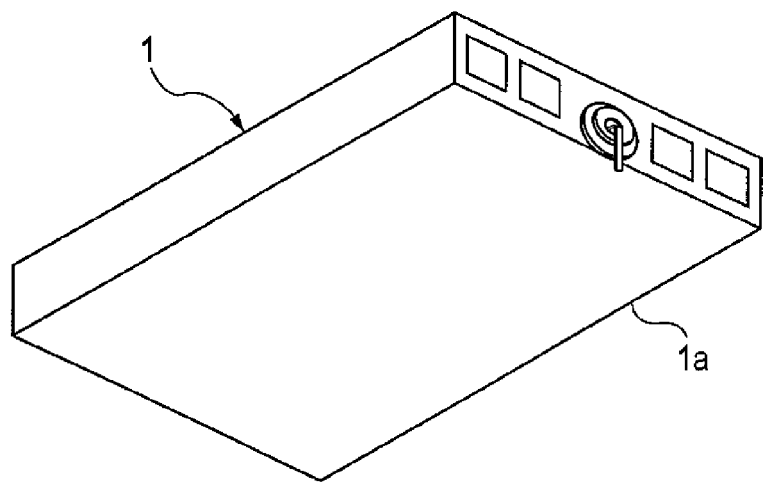
FIG. 1 is a perspective view that shows the face of a thin-film magnetic head slider that faces a medium.
Figure 2A:
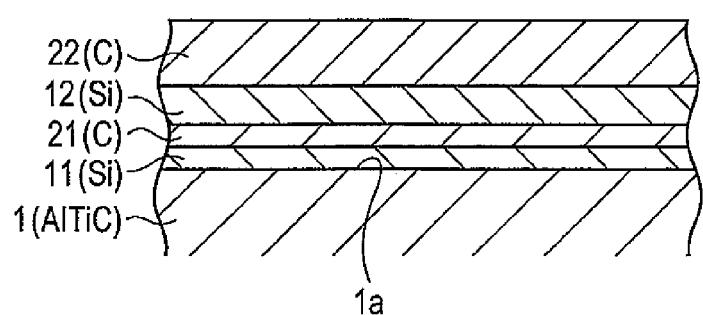
FIGS. 2A and 2B are a cross-sectional view and a plan view, respectively, each showing a step for processing the air bearing surface.
Figure 2B:
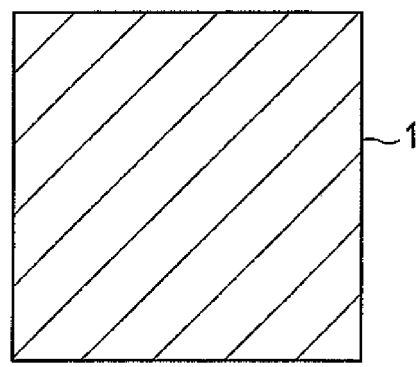
Figure 3A:
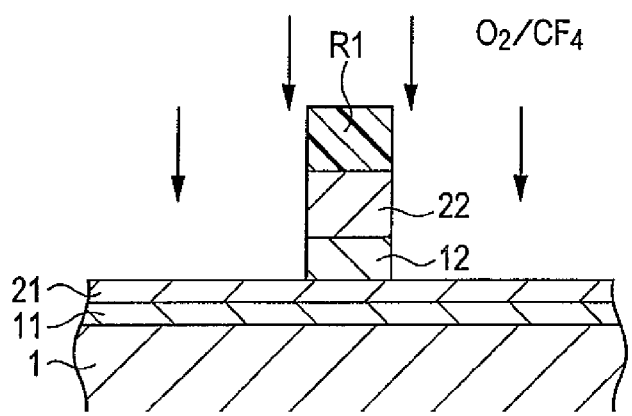
FIGS. 3A and 3B are a cross-sectional view and a plan view, respectively, each showing a step subsequent to the step illustrated in FIGS. 2A and 2B.
Figure 3B:
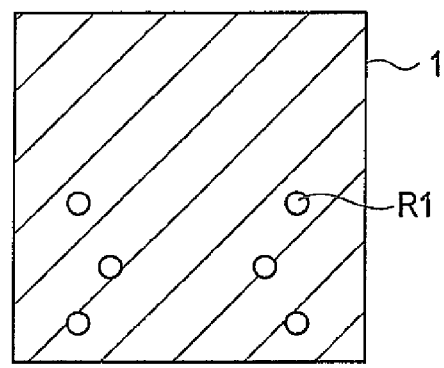
Figure 4A:
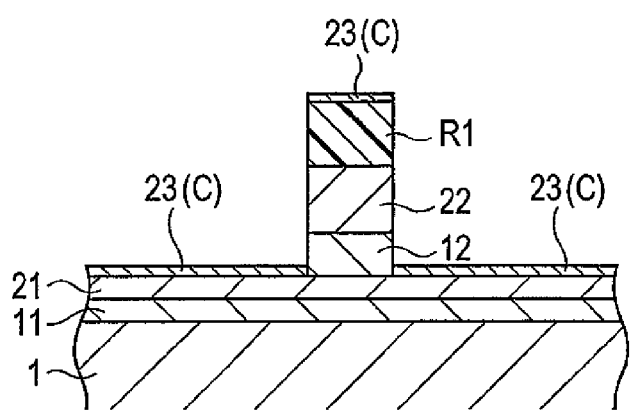
FIGS. 4A and 4B are a cross-sectional view and a plan view, respectively, each showing a step subsequent to the step illustrated in FIGS. 3A and 3B.
Figure 4B:
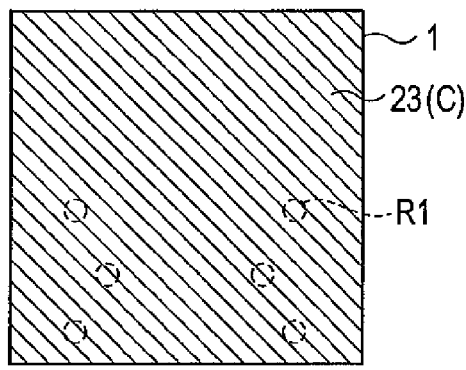
Figure 5A:
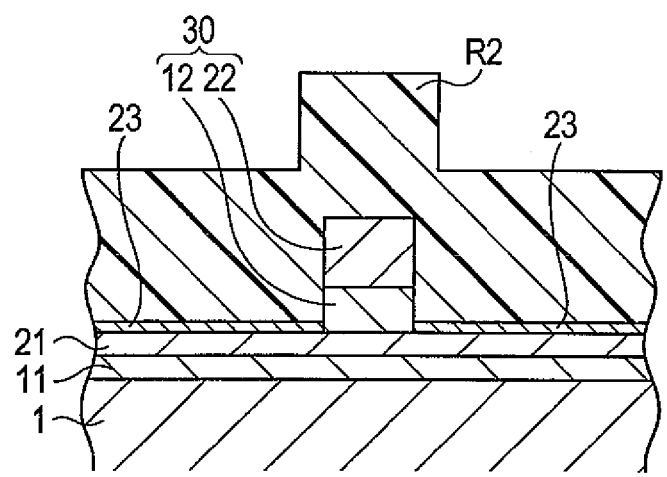
FIGS. 5A and 5B are a cross-sectional view and a plan view, respectively, each showing a step subsequent to the step illustrated in FIGS. 4A and 4B.
Figure 5B:
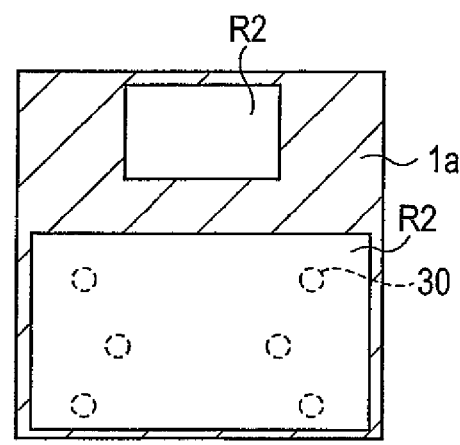

A thin-film magnetic head slider 1 shown in FIG. 1 is prepared. The thin-film magnetic head slider 1 is composed of aluminum titanium carbide (AlTiC) and is a substantially rectangular parallelepiped. The thin-film magnetic head slider 1 is of a flying type and includes, for example, a magnetoresistive element or an inductive element.

As shown in FIG. 2, a first silicon film 11, a first carbon film 21, a second silicon film 12, and a second carbon film 22 are laminated in that order on the face 1a of the thin-film magnetic head slider 1 facing the medium. The first silicon film 11 enhances the adhesion between the thin-film magnetic head slider 1 composed of AlTiC and the first carbon film 21. The first silicon film 11 preferably has a thickness of about 10 Å. The first carbon film 21 is disposed between the first silicon film 11 and the second silicon film 12 and has a thickness of about 30 Å. The first carbon film 21 functions as an etch stop film for reactive ion etching (RIE) in the subsequent step. The thickness of the second silicon film 12 is greater than that of the first silicon film 11. The thickness of the second carbon film 22 is greater than that of the first carbon film 21. The total thickness of the second silicon film 12 and the second carbon film 22 is about 25 nm in this embodiment and is identical to the thickness of individual protrusions 30 to be formed in the subsequent step.

As shown in FIG. 3, a protrusion resist pattern R1 for defining shapes of protrusions is formed on the second carbon film 22. Portions of the second carbon film 22 and the second silicon film 12 that are not covered with the protrusion resist pattern R1 are removed by RIE to expose the first carbon film 21. When the first carbon film 21 is exposed, RIE is completed. In this RIE step, $O_2$ and $CF_4$ are used as etching gases.

After the RIE step, as shown in FIG. 4, a third carbon film 23 is formed over the exposed first carbon film 21 and the protrusion resist pattern R1. It is highly probable that the exposed surface of the first carbon film 21 is fluorinated in the previous RIE step. However, by covering the first carbon film 21 with the third carbon film 23, a nonfluorinated carbon surface is formed. The thickness of the third carbon film 23 is preferably about 5 Å to cover the entire surface of the first carbon film 21.

After the formation of the third carbon film 23, the protrusion resist pattern R1 is removed. As a result, the plurality of protrusions 30 each including the second silicon film 12 and the second carbon film 22 are formed. The protrusions 30 minimize the contact area between the thin-film magnetic head slider 1 and a surface of a recording medium and reduce the adsorption force between the thin-film magnetic head slider 1 and the surface of the recording medium when the thin-film magnetic head slider 1 is in contact with the surface of the recording medium. The protrusions 30 in this embodiment each have a cylindrical shape and are each circular in plan view. The protrusions 30 each have a thickness of about 25 nm. Each of the protrusions 30 may have any shape.

Figure 6:
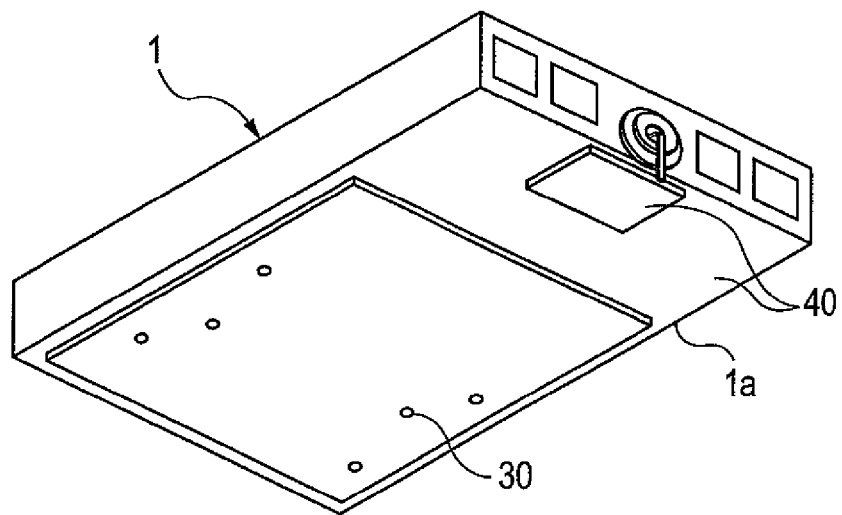
FIG. 6 is a perspective view showing the face of a thin-film magnetic head slider facing the medium, the face being formed by the method for processing the air bearing surface.

An ABS uneven pattern 40 is formed by photolithography on the face 1a of the thin-film magnetic head slider 1 that faces the surface of the medium. As shown in FIG. 5, a resist film is formed over the third carbon film 23 and the protrusions 30. Exposure and development are performed to form an ABS resist pattern R2 that define the ABS uneven pattern. Since the surface of the third carbon film 23 is a nonfluorinated carbon surface, sufficient adhesion between the third carbon film 23 and the ABS resist pattern R2 is achieved. For example, even when nitrogen is generated in exposure, the ABS resist pattern R2 is not detached. Portions of the third carbon film 23, the first carbon film 21, and the first silicon film 11 that are not covered with the ABS resist pattern R2 are removed by, for example, ion milling, RIE, or etching, and then the ABS resist pattern R2 is also removed. As a result, as shown in FIG. 6, the thin-film magnetic head slider 1 includes the protrusions 30 and the ABS uneven pattern 40 that are disposed on the face 1a facing the medium is produced.

In this embodiment described above, since the third carbon film 23 is formed on the first carbon film 21 exposed by RIE for forming the plurality of protrusions 30, the ABS resist pattern R2 is formed on the nonfluorinated carbon film. Even when the RIE step with $O_2$ and $CF_4$ is performed before the ABS resist pattern R2 is formed, sufficient adhesion of the ABS resist pattern R2 is achieved. Therefore, it is possible to accurately define the ABS uneven pattern.

In this embodiment, the third carbon film 23 formed on the first carbon film 21 exposed in the RIE step is a single layer. However, the third carbon film 23 may have a multilayer structure including a silicon film and a carbon film. Although the protrusions 30 each have a two-layer structure including the second silicon film 12 and the second carbon film 22, each protrusion 30 may have a three-, or higher-layer structure.

What is claimed is:

1. A method of processing an air bearing surface of a thin-film magnetic head slider, comprising the steps of:
    laminating a first silicon film, a first carbon film, a second silicon film, and a second carbon film in that order on a face of the thin-film magnetic head slider, the face facing a medium;
    forming a protrusion resist pattern that defines the position and shape of a protrusion;
    performing reactive ion etching with $O_2$ and $CF_4$ to remove portions of the second carbon film and the second silicon film, the portions being not covered with the protrusion resist pattern, and the first carbon film that functions as an etch stop film during the reactive ion etching;
    forming a third carbon film over the first carbon film exposed by removing the second carbon film and the second silicon film;
    removing the protrusion resist pattern to expose the protrusion having the second silicon film and the second carbon film;
    forming an air-bearing-surface resist pattern that defines the position and shape of an air-bearing-surface uneven pattern on exposed surfaces of the protrusion and the third carbon film; and
    processing a surface not covered with the air-bearing-surface resist pattern to impart the air-bearing-surface uneven pattern.

2. The method according to claim 1, wherein the third carbon film has a thickness of 5 Å or more.

3. The method according to claim 1, wherein the thickness of the second carbon film is greater than that of the first carbon film, and the thickness of the second silicon film is greater than that of the first silicon film.

4. An air bearing surface of a thin-film magnetic head slider comprising:
    a thin film magnetic head slider;

a first silicon film formed on the thin film magnetic head slider;
a first carbon film formed on the first silicon film;
a plurality of protrusions formed on the first carbon film; and
a third carbon film formed on the first carbon film and surrounds the sides of the plurality of protrusions.

5. The air bearing surface according to claim 4, wherein the plurality of protrusions each have a two-layer structure including a second silicon film and a second carbon film.

6. The air bearing surface according to claim 4, wherein each protrusion includes more than a three layer structure.

* * * * *